United States Patent Office

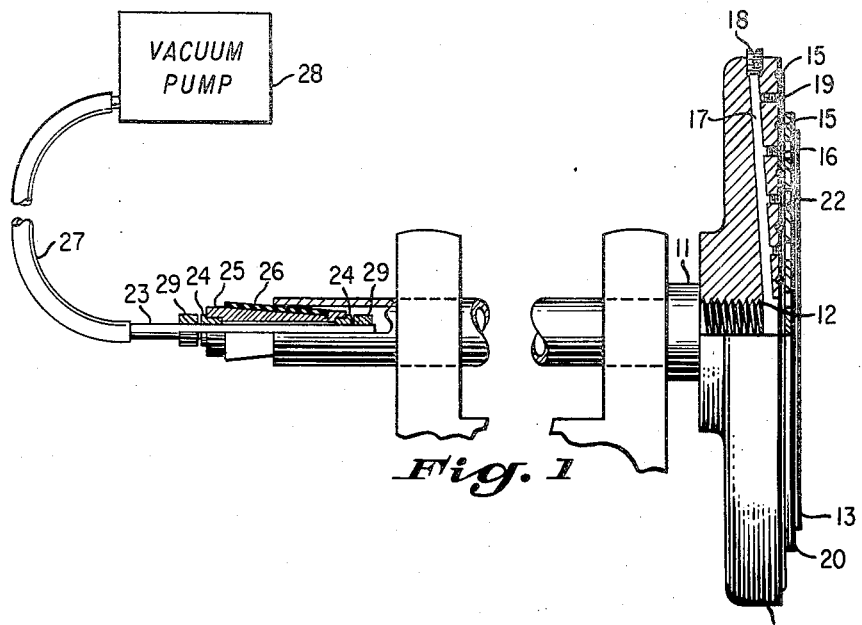
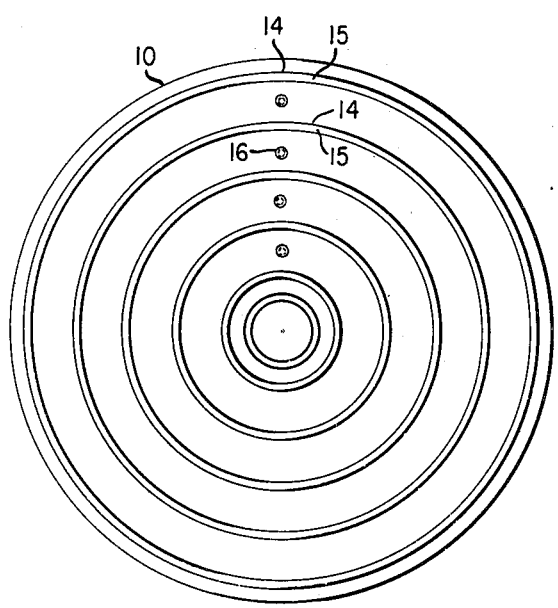 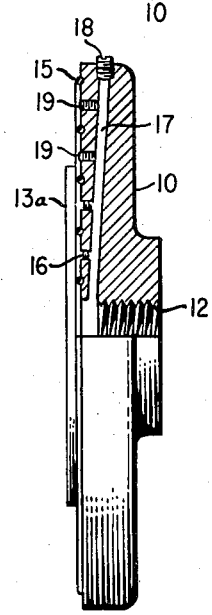

2,852,264
Patented Sept. 16, 1958

---

2,852,264

VACUUM CHUCK

Rosario Charles Granata, Lexington, Mass.

Application February 28, 1955, Serial No. 491,008

5 Claims. (Cl. 279—3)

This invention relates to machine tools in general and to lathes in particular.

On many occasions it is desirable to machine thin sheets of material on a lathe. Whenever such occasions arose in the past it was necessary to machine a special adapter, since standard chucks were not available to secure sheet material to the lathe headstock. It is evident that such an expedient was expensive and time consuming. A moment's thought will show that, even if the cost of a special adapter was warranted, the efficiency of such a device would be low. Clamps of some sort must extend over at least a portion of the exposed sheet being worked. It is impossible, therefore, to completely machine even one exposed surface of the sheet without changing the setup of the sheet. Changing setup in turn is a slow and exact procedure when close tolerances are required.

No device presently exists which allows machining of thin sheets of material on a lathe without the use of special adapters.

If the material being machined is soft, for example, polystyrene or copper, even the use of adapters is not fully satisfactory. Extreme care must be taken to avoid marks on the material and still hold the material firmly in place. A further complication arises from the well known fact that thin material is very susceptible to bowing. Therefore, if a mechanical adapter is to be used, the material must be flat-dropped before use since the adapter cannot straighten the material.

Therefore it is an object of this invention to provide a face plate for a lathe which will accommodate sheet material.

It is a further object of this invention to provide a face plate for a lathe which does not use mechanical clamps.

It is a further object of this invention to provide a face plate for a lathe which is adapted to many sizes of sheet material.

It is still a further object of this invention to provide a face plate for a lathe adapted to removing bends in sheet material.

Other objects of the present invention will become apparent from the following specification, the drawing relating thereto and from the claims hereinafter set forth.

In the drawings:

Figure 1 is a partial cross-section of a lathe embodying features of the present invention.

Figure 2 is a plan view of the vacuum face plate of the invention; and

Figure 3 is a partial cross-sectional view of the face plate of Figure 2 showing a work piece in place.

In general according to the present invention, atmospheric presure is used to hold sheet material against a faceplate. When the sheet is pressed against the faceplate a vacuum system removes substantially all the air on the face plate side of the sheet. The differential in pressure between the sides of the sheet causes the sheet to be firmly and evenly pressed against the faceplate and resilient seals mounted thereon. Frictional forces between the sheet and the faceplate prevent slipping of the sheet. A simple rotary joint connects the faceplate to a vacuum pump. The faceplate may be screwed or clamped to the lathe headstock so that the faceplate may be rotated. The sheet material rotates with the faceplate. The vacuum between the sheet and the faceplate is maintained through the rotary joint as the faceplate rotates. The lathe tool, which may be of any shape, is then brought into contact with the sheet to remove any desired amount of material.

Referring now to Figure 1, a specific embodiment of the present invention may be clearly seen. The faceplate 10 is attached to the headstock 11, preferably as shown by a screw thread 12 in the faceplate 10 which mates with a corresponding screw thread 13 in the headstock 11. The faceplate 10 may have any desired outside shape and be made from a variety of materials; a circular faceplate 12" in diameter of 2" stock is preferred to permit machining of many sizes of sheets. The sole requirement restricting the material of which the faceplate 10 is made is that it be solid so that a vacuum may be drawn within the faceplate. Concentric circular grooves 14 are impressed on the front side of the faceplate 10. Resilient cord sealing rings 15 are cemented in each of the circular grooves 14. It should be noted that the cross sectional shape of the grooves 14 and the sealing rings 15 is not material to this invention, it merely being necessary that there be more than one resilient ring firmly attached to the faceplate 10. A plurality of holes 16, one located in each of the annular areas between the grooves 14, and normal to the front surface, are formed in face plate 10. Each of holes 16 is tapped as shown. Each of the holes 16 terminates in a radial opening 17 formed inside the faceplate 10. It should be noted that the radial opening 17 and the holes 16 shown in Figure 1 are drilled; the manner in which they are formed is immaterial. It is necessary only that a continuous opening be formed from a position between each of the sealing rings 15 and the center of the faceplate 10. The forward slant of the radial opening 17 is not material, it being desirable only to enable the outer end of the radial opening 17 to be countersunk and threaded to receive a set screw 18. Set screws 19 are provided to stop any of the holes 16 which lie outside the material being machined.

The rotating joint consists of an elongated tube 23 around the outside of which two bearings 24 are mounted at predetermined distances. The clearance between the tube 23 and the bearings 24 is not critical, it being sufficient that the clearance not exceed approximately .003". An annular sleeve 25 is mounted on the outside of the bearings 24. It is necessary that a press fit be made between the annular sleeve 25 and the bearings 24. The outside of the annular sleeve 25 is tapered along its length. A resilient covering 26 is placed on the annular sleeve 25. Bushings 29 may be secured to the tube 23 to adjust the position of the bearings 24, sleeve 25 and covering 26 along the length of the tube 23. A connection 27, which is preferably a rubber hose, is made between the tube 23 and a vacuum pump 28. The completed assembly is inserted in the spindle bore of the lathe.

When the pump is in operation air is drawn from the holes 16 in the faceplate 10 through the radial opening 17 and thence through the center of the tube 23. A difference in pressure is immediately built up which forces the rotating joint assembly consisting of the bearings 24, the annular sleeve 25 and resilient covering 26 into the spindle bore of the lathe. The taper on the outside of the annular sleeve 25 forces the resilient covering 26 to compress against the spindle bore like the cork in a bottle. The same difference in pressure forces the material being machined, for example, the flat work piece 13a of Figure 3, against the working face of the face plate. The holes or openings 16 lying outside the area of the work piece 13a are closed by set screws 19 so as to maintain the vacuum in the radial opening 17. The resilient rings 15 are compressed so that a perfect seal is formed between the material 13a and the face plate 10. The number of resilient rings 15 ensure a perfect seal even though one may not be absolutely effective. Experience has shown that the clearance between the bearings 24 and the tube 23 is not critical if the two described seals are perfect. Frictional forces hold the resilient sleeve 26 against the headstock of the lathe while it rotates. Therefore the seal remains perfect while the face plate 10 with the sheet 13a pressed thereagainst is rotated. The sheet is evenly pressed against the flat surface of the faceplate 10 by atmospheric pressure. Therefore even though some bending of work piece 13a may have existed, such bends are removed during the machining process.

When very thin sheet material is to be machined, it is desirable to place a reinforcing or backing plate 20 between the work piece 13 and the sealing rings 15, as shown in Figure 1, to prevent deformation or bending of the work piece into the depressions between the rings. Reinforcing plate 20 may be simply a sheet of stiff material, such as metal, of an area at least as great as the piece 13 to be machined, having its outer surface ground to present a smooth surface to the work piece. Plate 20 has a number of holes 22 formed therein, these holes being randomly distributed over the area of the plate, care being taken to locate the holes so as to be in the annular areas between the sealing rings 15 when the plate is in place. As before, the openings in the face plate 10 lying outside the area of reinforcing plate 20 are closed by set screws 19, and when work piece 13, of sufficient area to cover all of the holes 22 lying within the outermost effective sealing ring, is placed over reinforcing plate 20, the differential in pressure between the inside of the face plate and the atmosphere holds the reinforcing plate and the work piece against the face plate. The sheet 13 is held sufficiently firmly against the smooth outer surface of the reinforcing plate 20 to seal the openings 22 and to prevent the entry of air between the thin work sheet and the reinforcing plate, and the reinforcing plate, in turn, is forced against and compresses resilient rings 15 to form an excellent seal between the reinforcing plate and face plate 10.

Although the present invention has been described with particular reference to a lathe, it will be obvious to persons skilled in the art that the concept of holding sheet material by drawing a vacuum on one side so that atmospheric pressure will hold the material in place can be utilized to great advantage with other machine tools such as milling machines. No material change in the practical embodiment of this invention would be required. Therefore it is felt that the present invention should be restricted only by the spirit and scope of the appended claims.

What is claimed is:

1. A rotating faceplate assembly in a lathe to hold sheet stock thereon comprising the combination of a hollow faceplate, said faceplate having an exposed outer surface, a plurality of resilient members, each said resilient member being intimately attached to said exposed outer surface to form a predetermined pattern, a plurality of openings formed in said faceplate connecting said exposed outer surface to a common manifold within said faceplate, one of each of said openings being disposed in each of the interstices between said resilient members, a vacuum pump, and means connecting said vacuum pump and said common manifold, said means including a vacuum tight rotating joint.

2. A chuck for holding a work piece having a flat surface comprising, a work holding element adapted for rotation in a lathe and having a generally flat outer surface, said element having a plurality of concentric grooves formed in said outer surface, a like plurality of resilient sealing rings positioned in said grooves with a portion of each extending beyond said surface, and suction means communicating with said outer surface at points between said rings for holding the flat surface of the work piece against said rings by atmospheric pressure.

3. A chuck for holding a work piece having a flat surface comprising, a work holding element adapted to be supported on the spindle of a lathe and having a generally flat outer surface, said element having at least two concentric grooves formed in said outer surface, resilient sealing rings positioned in each of said grooves with a portion of each extending beyond said surface, and suction means communicating through openings in said outer surface between said rings for holding the flat surface of the work piece against said rings by atmospheric pressure.

4. A chuck for holding sheet material comprising, a work holding element adapted to be supported on the spindle of a lathe and having a generally flat outer surface, said element having a plurality of concentric grooves formed in said outer surface, resilient sealing rings positioned in each of said grooves with a portion of each extending beyond said surface, a plurality of openings in said outer surface, with at least one disposed between adjacent ones of said rings, communicating with a common manifold within said element, and suction means connected to said manifold for holding the sheet material against said rings by atmospheric pressure.

5. A chuck for holding a work piece having a flat surface comprising, a work holding element adapted for rotation in a machine tool and having a generally flat outer surface, said element having a plurality of concentric grooves formed in said outer surface, a like plurality of resilient sealing rings positioned in said grooves with a portion of each extending beyond said surface, suction means communicating with said outer surface through openings between each of said rings for holding the flat surface of the work piece against said rings by atmospheric pressure, and means for closing selected ones of said openings to control the area of holding of the work piece and to permit holding of work pieces of differing areas.

References Cited in the file of this patent

UNITED STATES PATENTS

| | | |
|---|---|---|
| 2,273,396 | Couty | Feb. 17, 1942 |
| 2,398,959 | Petry | Apr. 23, 1946 |
| 2,443,987 | Morrison et al. | June 22, 1948 |
| 2,712,457 | Kimbo | July 5, 1955 |
| 2,730,370 | Brewster | Jan. 10, 1956 |